United States Patent [19]
Sperry et al.

[11] Patent Number: 5,816,502
[45] Date of Patent: Oct. 6, 1998

[54] LAWN CHEMICAL DISPERSAL SYSTEM

[76] Inventors: Judy O. Sperry; Mark L. Sperry, both of 5500 Vicksburg St., New Orleans, La. 70124

[21] Appl. No.: 835,407

[22] Filed: Apr. 8, 1997

[51] Int. Cl.$^6$ ..................................................... A62C 13/62
[52] U.S. Cl. ........................... 239/304; 239/309; 239/310; 239/462; 239/575; 222/82
[58] Field of Search ............................. 239/142, 303–304, 239/306, 309–310, 317, 399–400, 406, 407, 413, 462, 463, 571, 575, 590, 590.3, 590.5, 553, 553.3, 553.5; 222/82, 88

[56] References Cited

U.S. PATENT DOCUMENTS

| | | | |
|---|---|---|---|
| 3,833,177 | 9/1974 | Pasley et al. | 239/309 |
| 4,340,179 | 7/1982 | Kanpp | 239/310 |
| 4,917,304 | 4/1990 | Mazzei et al. | 239/304 |
| 5,096,123 | 3/1992 | Petitgoue | 239/310 |
| 5,135,174 | 8/1992 | Chaplinsky | 239/310 |
| 5,150,840 | 9/1992 | Grynkiewicz | 239/310 |
| 5,366,159 | 11/1994 | Childers | 239/310 |
| 5,454,516 | 10/1995 | Smyrl | 239/305 |

*Primary Examiner*—Andres Kashnikow
*Assistant Examiner*—Lisa Ann Douglas
*Attorney, Agent, or Firm*—Joseph N. Breaux

[57] ABSTRACT

A lawn chemical dispersal system including a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; a bottle connecting assembly including a bottle neck insertion cavity, a resilient bottle neck sealing ring, a mouth cover rupturing tube and a control valve, the control valve being in connection between the rupturing tube and the flow pipe; a lawn chemical bottle including a chemical bottle cover adhesively secured over and covering a chemical bottle opening and a chemical bottle neck, the chemical bottle neck sealing seating against the resilient bottle neck sealing ring when the chemical bottle neck is inserted into the bottle neck insertion cavity; a mixing assembly having an intake side and a discharge side, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

16 Claims, 3 Drawing Sheets

LAWN CHEMICAL DISPERSAL SYSTEM

TECHNICAL FIELD

The present invention relates to lawn care products and devices and more particularly to a system for mixing lawn care chemicals and water to form a liquid lawn care solution and dispersing the liquid lawn care solution through a spray nozzle wherein the dispersal system includes a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; a bottle connecting assembly including a bottle neck insertion cavity, a resilient bottle neck sealing ring, a mouth cover rupturing tube and a control valve, the control valve being in connection between the rupturing tube and the flow pipe; a lawn chemical bottle including a chemical bottle cover adhesively secured over and covering a chemical bottle opening and a chemical bottle neck, the chemical bottle neck being sized to sealing seat against the resilient bottle neck sealing ring when the chemical bottle neck is inserted into the bottle neck insertion cavity of the bottle connecting assembly; a mixing assembly having an intake side and a discharge side, the intake side being in connection with the flow pipe, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

BACKGROUND OF THE INVENTION

It is often desirable to treat lawns and garden shrubbery with lawn care chemicals. Although the application of these lawn care chemicals is beneficial, the lawn care chemicals are typically applied in aqueous solutions containing concentrations of the lawn care chemicals that can sometimes irritate the skin or otherwise adversely effect the person applying the lawn care chemicals. It would be a benefit, therefore, to have a lawn chemical dispersal system that included a remotely positionable spray nozzle that would disperse the lawn chemicals over a desired area that minimized contact between the liquid lawn chemical solution and the user. Additionally, because large distribution areas are desirable, it would be a further benefit if the remotely positionable nozzle was incorporated into an oscillating sprinkler head to maximize the Lawn chemical dispersal area. Also, because the lawn chemicals can come in powder, granular and liquid forms, it would be a benefit to have a lawn chemical dispersal system that allowed a user to connect a bottle containing a quantity of the desired lawn chemical between a water supply source and the remotely positionable nozzle without requiring any premixing of the powdered or granular form lawn chemicals. Thorough mixing of the powdered and granular lawn chemicals with water increases their efficiency and lowers the quantities of chemicals that must be applied to achieve a desired effect. It would be highly desirable, therefore, to have a lawn chemical dispersal system that included a mixing assembly stage positioned before the remotely positioned nozzle for providing additional mixing of the powered and granulated lawn chemicals with water prior to dispersal.

SUMMARY OF THE INVENTION

It is thus an object of the invention to provide a lawn chemical dispersal system that minimizes contact between the liquid lawn chemical solution and the user.

It is a further object of the invention to provide a lawn chemical dispersal system that includes a remotely positionable spray nozzle for dispersing the lawn chemicals over a desired area.

It is a still further object of the invention to provide a lawn chemical dispersal system that includes a remotely positionable oscillating sprinkler head having a number of nozzles to maximize the lawn chemical dispersal area.

It is a still further object of the invention to provide a lawn chemical dispersal system that allows a user to connect a bottle containing a quantity of the desired lawn chemical between a water supply source and the remotely positionable nozzle without requiring any premixing of powdered or granular form lawn chemicals.

It is a still further object of the invention to provide a lawn chemical dispersal system that includes a mixing assembly stage positioned before a remotely positioned nozzle for providing additional mixing of powered and granulated form lawn chemicals with water prior to dispersal.

It is a still further object of the invention to provide a lawn chemical dispersal system that includes a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; a bottle connecting assembly including a bottle neck insertion cavity, a resilient bottle neck sealing ring, a mouth cover rupturing tube and a control valve, the control valve being in connection between the rupturing tube and the flow pipe; a lawn chemical bottle including a chemical bottle cover adhesively secured over and covering a chemical bottle opening and a chemical bottle neck, the chemical bottle neck being sized to sealing seat against the resilient bottle neck sealing ring when the chemical bottle neck is inserted into the bottle neck insertion cavity of the bottle connecting assembly; a mixing assembly having an intake side and a discharge side, the intake side being in connection with the flow pipe, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

It is a still further object of the invention to provide a lawn chemical dispersal system that includes a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; multiple bottle connecting assemblies, each bottle connecting assembly including a bottle neck insertion cavity, a resilient bottle neck sealing ring, a mouth cover rupturing tube and a control valve, the control valve being in connection between the rupturing tube and the flow pipe; multiple lawn chemical bottles, each lawn chemical bottle including a chemical bottle cover adhesively secured over and covering a chemical bottle opening and a chemical bottle neck, the chemical bottle neck being sized Lo sealing seat against the resilient bottle neck sealing ring when the chemical bottle neck is inserted into the bottle neck insertion cavity of one of the multiple bottle connecting assemblies; a mixing assembly having an intake side and a discharge side, the intake side being in connection with the flow pipe, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

It is a still further object of the invention to provide a lawn chemical dispersal system that accomplishes some or all of the above objects in combination.

Accordingly, a lawn chemical dispersal system is provided. The lawn chemical dispersal system includes a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; a bottle connecting assembly including a bottle neck insertion cavity, a resilient bottle neck sealing ring, a mouth cover rupturing tube and a control valve, the control valve being in connection between the rupturing tube and the flow pipe; a lawn chemical bottle including a chemical bottle cover adhesively secured over and covering a chemical bottle opening and a chemical bottle neck, the chemical bottle neck being sized to sealing seat against the resilient bottle neck sealing ring when the chemical bottle neck is inserted into the bottle neck insertion cavity of the bottle connecting assembly; a mixing assembly having an intake side and a discharge side, the intake side being in connection with the flow pipe, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

BRIEF DESCRIPTION OF DRAWINGS

For a further under standing of the nature and objects of the present invention, reference should be made to the following detailed description, taken in conjunction with the accompanying drawings, in which line elements are giver the same or analogous reference numbers and wherein.

DESCRIPTION OF THE EXEMPLARY EMBODIMENT

Figure 1:
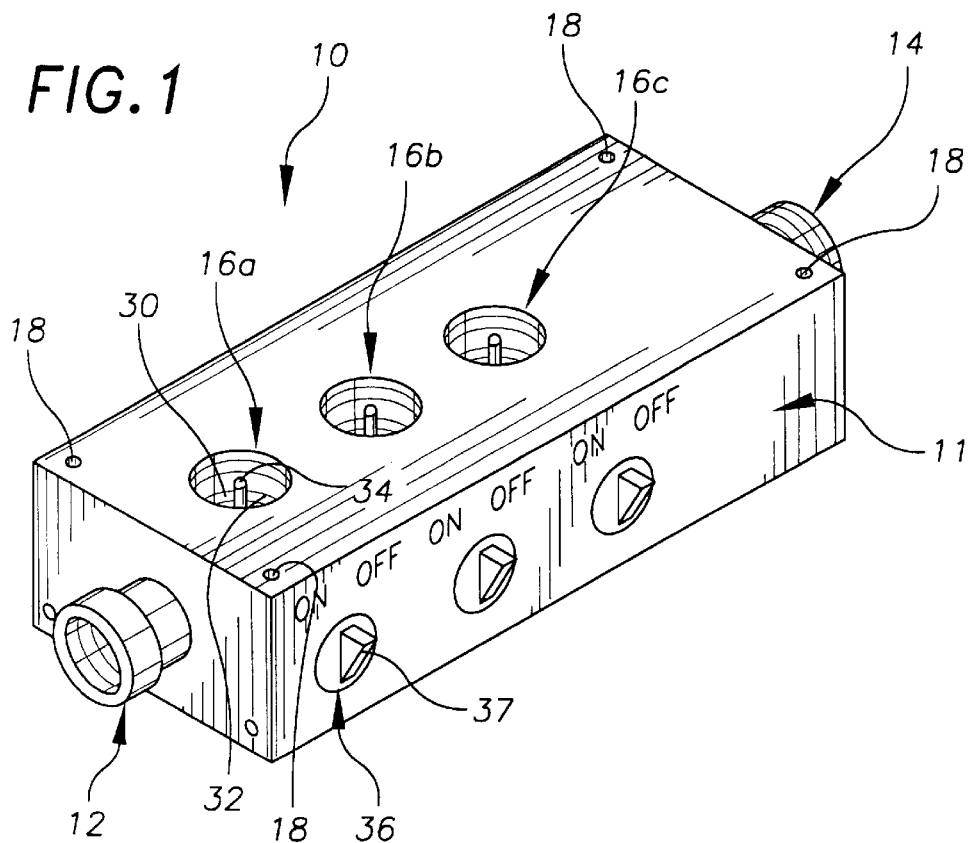
FIG. 1 is a perspective view of an exemplary embodiment of the lawn chemical mixing unit of the chemical dispersal system of the present invention showing the intake hose coupling, the discharge hose coupling, and three bottle connecting assemblies each including a bottle neck insertion cavity, a resilient bottle neck sealing ring, a mouth cover rupturing tube and a control valve.

FIG. 1 shows an exemplary embodiment of the lawn chemical mixing unit of the chemical dispersal system of the present invention, generally designated by the numeral 10. Lawn chemical mixing unit: 10 includes a mixing unit housing, generally designated 11; an intake hose coupling, generally designated 12; a discharge hose coupling, generally designated 14; three bottle connecting assemblies, generally designated 16a,16b,16c ; four cover-connecting slots 18; with reference now to FIG. 2, three chemical bottles, generally designated 19a,19b,19c ; a mixing unit cover, generally designated 21; and, with reference now to FIG. 4, a flow pipe, generally designated 22; an anti-backflow valve, generally designated 24; and a mixing assembly, generally designated 26.

Figure 2:
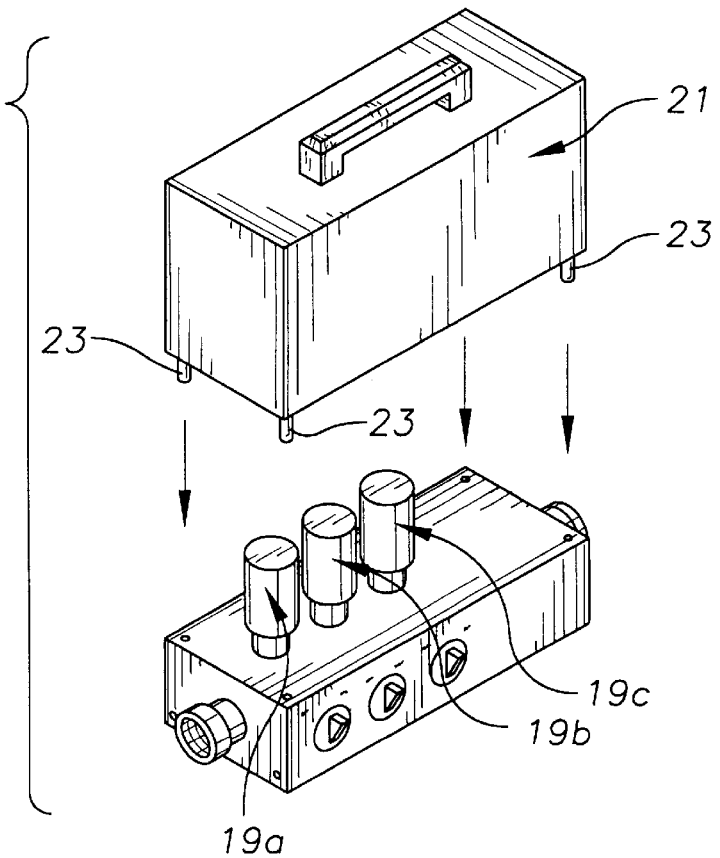
FIG. 2 is a partially exploded perspective view showing the lawn chemical mixing unit of FIG. 1 with three representative lawn chemical bottles installed in connection with the three bottle connecting assemblies and an optional chemical bottle cover exploded away from the lawn chemical mixing unit that includes a handle and four locking tabs.

Referring back to FIG. 1, mixing unit housing 11 is box shaped and of conventional molded plastic construction. In this embodiment cover-connecting slots 18 are cylinder shaped and formed into mixing unit housing 11 during the molding process. Cover-connecting slots 18 receive and the walls defining connecting slots 18 frictionally hold the four identical cylindrically-shaped connecting rods 23 (FIG. 2—only three shown) that extend downwardly from the four bottom corners of mixing unit cover 21 (FIG. 2). Intake hose coupling 12 is a conventional female garden hose coupling. Discharge hose coupling 14 is a conventional male garden hose coupling.

Figure 3:
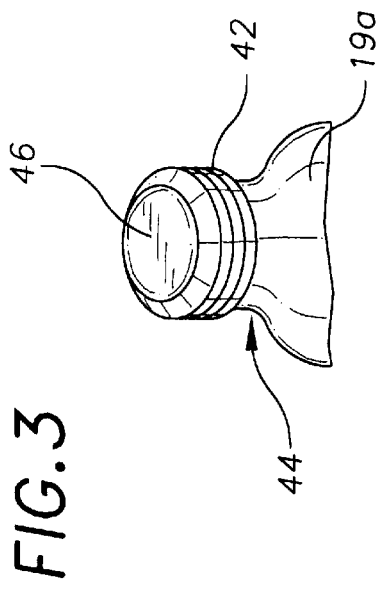
FIG. 3 is a detail perspective view of the top portion of one of the representative lawn chemical bottles of FIG. 2 on showing the chemical bottle cover adhesively secured over and covering the chemical bottle opening and the chemical bottle neck.
Figure 4:
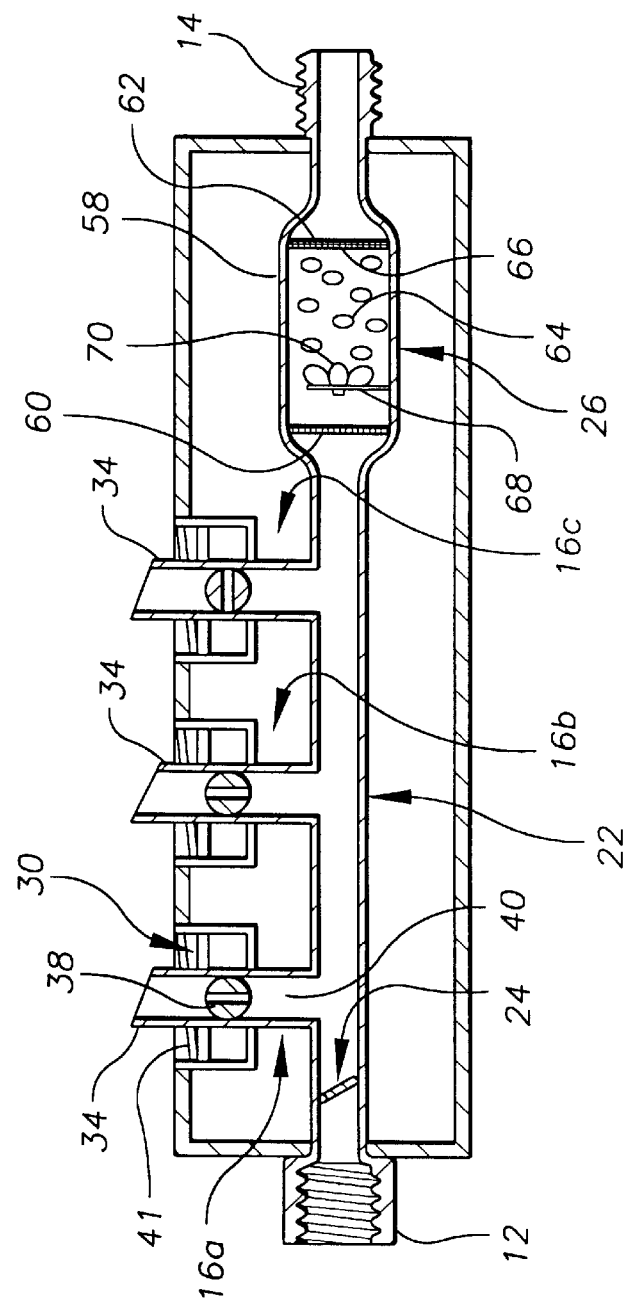
FIG. 4 is a cross-sectional view of the chemical mixing unit of FIG. 1 along the line I—I showing the intake hose coupling; the flow pipe; the anti-backflow valve installed within the flow pipe; the three bottle connecting assemblies each including a bottle neck insertion cavity, a resilient bottle neck sealing ring, a mouth cover rupturing tube and a control valve; the mixing assembly including the intake screen, the discharge screen, the turbulence beads, and the flow-driven bead agitator; and the discharge hose coupling.

Bottle connecting assemblies 16a,16b and 16c are identical in construction and operation. Although the following discussion is directed toward bottle connecting assembly 16a, the discussion is intended to be understood as equally applicable to bottle connecting assemblies 16b and 16c. Bottle connecting assembly 16a is formed from plastic and includes a bottle neck insertion cavity defined into mixing unit housing 11, a resilient bottle neck sealing ring 32, a mouth cover rupturing tube 34, and a control valve, generally designated 36. Referring to FIG. 4, in this embodiment control valve 36 (FIG. 1) includes a conventional ball-type valve seal 38 installed within rupturing tube 34 that is actuated by a valve actuator knob 37 (FIG. 1 ). Rupturing tube 34 is hollow and provides a pathway 40 for lawn chemicals positioned within lawn chemical bottle 19a to enter flow pipe 22. In this embodiment, the wall defining bottle neck insertion cavity 30 have threads 41 thereon for engaging bottle threads 42 provided on the neck 44 of chemical bottle 19a as shown in FIG. 3. With further reference to FIG. 3, each chemical bottle 19a–c has a chemical bottle cover 46 adhesively secured over the rim of the bottle opening. During insertion of neck 44 into neck insertion cavity 30 (FIG. 4), rupturing tube 34 (FIG. 4) ruptures bottle cover 46 and is positioned within a chemical holding compartment formed within chemical bottle 19a.

Figure 5:
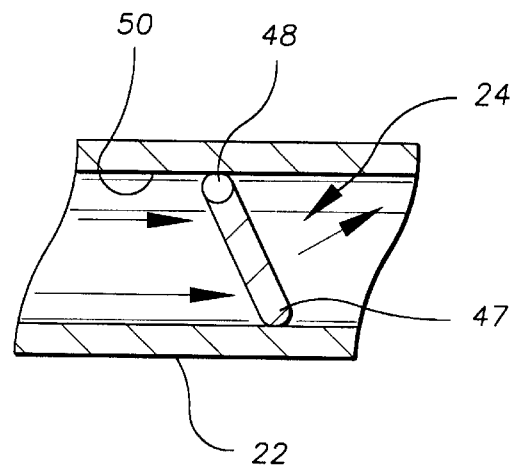
FIG. 5 is a detail cross sectional view of the anti-backflow valve showing a section of the flow pipe, and the pivoting one-way valve clapper.

Referring to FIG. 4, flow pipe 22 is a length of plastic tubing that is connected at one end to intake hose coupling 12, at the other end to mixing assembly 26; and has the three rupturing tubes 34 of bottle connecting assemblies 16a–c attached along a center section thereof. Anti-backflow valve 24 is installed within flow pipe 22 between intake nose coupling 12 and the rupturing tube 34 of bottle connecting assembly 16a to prevent any lawn chemicals from traveling back into and contaminating the water supply system. Referring to FIG. 5, in this embodiment anti-backflow valve 24 includes a resilient plastic valve clapper 47 that is pivotally connecting by a pivoting hinge 48 to the interior wall 50 of flow pipe 22. Valve clapper allows fluid flow in a first direction away from intake hose coupling 12 (FIG. 4) but prevents fluid flow in the opposite direction.

Referring back to FIG. 4, mixing assembly 26 includes a mixer housing section 58, a plastic mesh intake screen 60, a plastic mesh discharge screen 62, a number of plastic, spherically shaped turbulence beads 64, a bead turbulence cavity 66, and a flow-driven spinnable turbine bead agitator 68 having a number of turbine paddles 70. Bead agitator 68 is positioned within bead turbulence cavity 66 and turbine paddles 70 are angled such that fluid flow through bead turbulence cavity 66 causes bead agitator 68 to spin rapidly within bead agitator cavity 66 causing turbulence beads 64 to swirl and mix within bead turbulence cavity 66. This swirling and mixing of turbulence beads 64 causes lawn chemicals in the form of powders and granules to become more completely dissolved into the water supplied through intake hose coupling 12 prior to exiting mixing unit 10 through discharge hose coupling 14.

Figure 6:
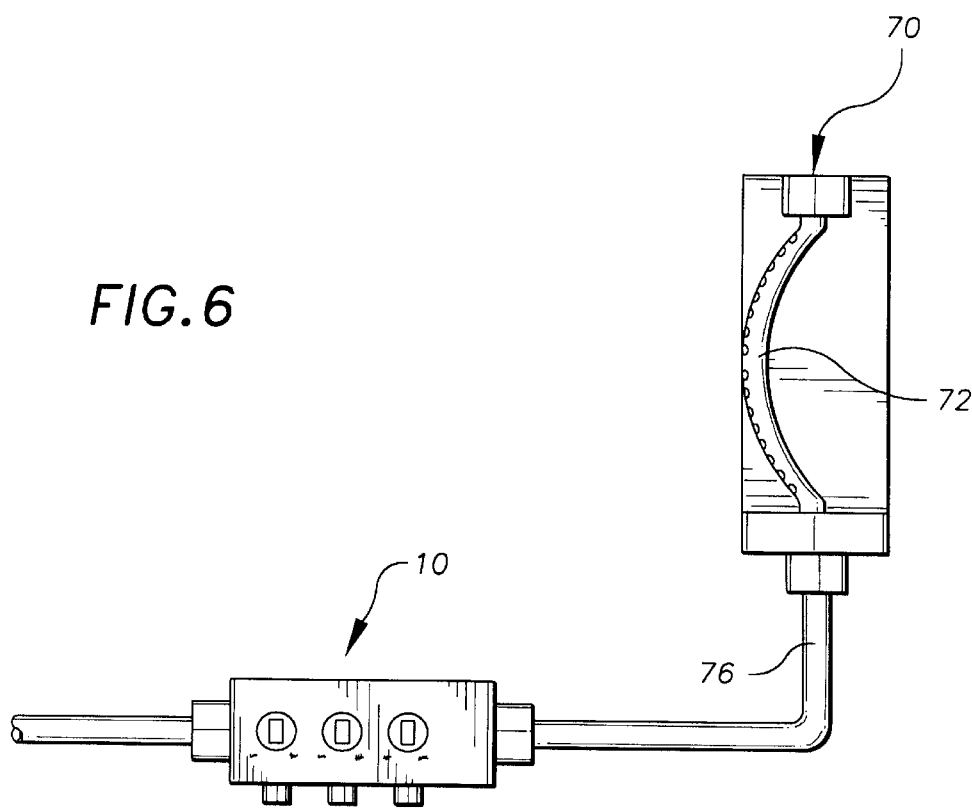
FIG. 6 is a top plan view of an exemplary embodiment of the chemical dispersal system of the present invention showing the interconnection between the lawn chemical mixing unit and an exemplary sprinkler head.

With reference to FIG. 6, in this embodiment lawn chemical dispersal system includes a conventional oscillating sprinkler mechanism 70. Sprinkler mechanism 70 includes a curved sprinkler nozzle tube 72 that, oscillates back and forth. Sprinkler mechanism 70 is coupled to chemical mixing unit 10 by a section 76 of conventional garden hose.

With general reference to FIGS. 1–6, in use, sprinkler mechanism 70 is position in the desired chemical dispersal area and left. Water is then supplied to chemical mixing unit 10 and the desired chemical selected by positioning the desired valve actuator knobs 37 of the desired chemical bottle connecting assemblies 16a–c.

It can be seen from the preceding description that a lawn chemical dispersal system has been provided that minimizes contact between the liquid lawn chemical solution and the user; that includes a remotely positionable spray nozzle for dispersing the lawn chemicals over a desired area; that includes a remotely positionable oscillating sprinkler head having a number of nozzles to maximize the lawn chemical dispersal area; that allows a user to connect a bottle containing a quantity of the desired lawn chemical between a water supply source and the remotely positionable nozzle without requiring any premixing of powdered or granular form lawn chemicals; that includes a mixing assembly stage positioned before a remotely positioned nozzle for providing additional mixing of powdered and granulated form lawn chemicals with water prior to dispersal; and that includes a remotely positionable spray nozzle having a nozzle intake connector and at least one nozzle discharge orifice; and a lawn chemical mixing unit having an intake hose coupling, a flow pipe in connection with the intake hose coupling; an anti-backflow valve installed within the flow pipe; a bottle connecting assembly including a bottle neck insertion cavity, a resilient bottle neck sealing ring, a mouth cover rupturing tube and a control valve, the control valve being in connection between the rupturing tube and the flow pipe; a lawn chemical bottle including a chemical bottle cover adhesively secured over and covering a chemical bottle opening and a chemical bottle neck, the chemical bottle neck being sized to sealing seat against the resilient bottle neck sealing ring when the chemical bottle neck is inserted into the bottle neck insertion cavity of the bottle connecting assembly; a mixing assembly having an intake side and a discharge side, the intake side being in connection with the flow pipe, the mixing assembly further including an intake side screen and a discharge side screen defining a bead turbulence cavity therebetween, a supply of turbulence beads entrapped within the bead turbulence cavity, and a flow-driven bead agitator positioned within the turbulence cavity in a manner to agitate the quantity of beads when fluid flows through the bead turbulence cavity; and a discharge hose coupling in connection with the discharge side of mixing assembly, the discharge hose coupling being connectable to the nozzle intake connector in a manner to establish pressurized fluid flow therebetween.

It is noted that the embodiments of the lawn chemical dispersal system described herein in detail for exemplary purposes are of course subject to many different variations in structure, design, application and methodology. Because many varying and different embodiments may be made within the scope of the inventive concept(s) herein taught, and because many modifications may be mace in the embodiment herein detailed in accordance with the descriptive requirements of the law, it is to be understood that the details herein are to be interpreted as illustrative and not in a limiting sense.

What is claimed is:

1. A lawn chemical dispersal system comprising:
a remotely positionable spray nozzle having a nozzle intake connector and at least one nozzle discharge orifice; and
a lawn chemical mixing unit having:
an intake hose coupling;
a flow pipe in connection with said intake hose coupling;
an anti-backflow valve installed within said flow pipe;
a bottle connecting assembly including a bottle neck insertion cavity, a resilient bottle neck sealing ring, a mouth cover rupturing tube and a control valve, said control valve being in connection between said rupturing tube and said flow pipe;
a lawn chemical bottle including a chemical bottle cover adhesively secured over and covering a chemical bottle opening and a chemical bottle neck, said chemical bottle neck being sized to sealing seat against said resilient bottle neck sealing ring when said chemical bottle neck is inserted into said bottle neck insertion cavity of said bottle connecting assembly;

a mixing assembly having an intake side and a discharge side, said intake side being in connection with said flow pipe, said mixing assembly further including an intake side screen and a discharge side screen defining a bead turbulence cavity therebetween, a supply of turbulence beads entrapped within said bead turbulence cavity, and a flow-driven bead agitator positioned within said turbulence cavity in a manner to agitate said quantity of beads when fluid flows through said bead turbulence cavity; and a discharge hose coupling in connection with said discharge side of mixing assembly, said discharge hose coupling being connectable to said nozzle intake connector in a manner to establish pressurized fluid flow therebetween.

2. The lawn chemical dispersal system of claim 1, wherein:

said turbulence beads are spherically shaped.

3. The lawn chemical dispersal system of claim 2, wherein:

said bead agitator includes a spinnable turbine having a number of turbine paddles, said turbine paddles being angled such that fluid flow through said bead turbulence cavity causes said bead agitator to spin within said bead agitator cavity causing said turbulence beads to swirl and mix within said bead turbulence cavity.

4. The lawn chemical dispersal system of claim 3, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

5. The lawn chemical dispersal system of claim 2, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

6. The lawn chemical dispersal system of claim 2 wherein:

said anti-backflow valve includes a resilient plastic valve clapper that is pivotally connected by a pivoting hinge to an interior wall of said flow pipe.

7. The lawn chemical dispersal system of claim 6, wherein:

said bead agitator includes a spinnable turbine having a number of turbine paddles, said turbine paddles being angled such that fluid flow through said bead turbulence cavity causes said bead agitator to spin within said bead agitator cavity causing said turbulence beads to swirl and mix within said bead turbulence cavity.

8. The lawn chemical dispersal system of claim 7, wherein:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

9. The lawn chemical dispersal system of claim 6, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

10. The lawn chemical dispersal system of claim 1 wherein:

said anti-backflow valve includes a resilient plastic valve clapper that is pivotally connected by a pivoting hinge to an interior wall of said flow pipe.

11. The lawn chemical dispersal system of claim 10, wherein:

said bead agitator includes a spinnable turbine having a number of turbine paddles, said turbine paddles being angled such that fluid flow through said bead turbulence cavity causes said bead agitator to spin within said bead agitator cavity causing said turbulence beads to swirl and mix within said bead turbulence cavity.

12. The lawn chemical dispersal system of claim 11, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

13. The lawn chemical dispersal system of claim 10, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

14. The lawn chemical dispersal system of claim 1, wherein:

said bead agitator includes a spinnable turbine having a number of turbine paddles, said turbine paddles being angled such that fluid flow through said bead turbulence cavity causes said bead agitator to spin within said bead agitator cavity causing said turbulence beads to swirl and mix within said bead turbulence cavity.

15. The lawn chemical dispersal system of claim 14, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

16. The lawn chemical dispersal system of claim 1, further including:

a box-shaped mixing unit cover having four identical cylindrically-shaped connecting rods that extend downwardly from four bottom corners thereof; and said chemical mixing unit includes a mixing unit housing, said mixing unit housing having a plurality of cover-connecting slots sized and positioned in a manner to receive therein said connecting rods.

* * * * *